Patented May 31, 1938

2,119,270

UNITED STATES PATENT OFFICE 2,119,270

METHOD FOR TREATING THE RESIDUES FROM THE ROASTING OF THE IRON PYRITES

Ineo De Vecchis, Paris, France

No Drawing. Application September 6, 1934, Serial No. 742,976. In France September 16, 1933

1 Claim. (Cl. 209—8)

The invention relates to a method for treating the residues from the roasting of iron pyrites (especially those used for the manufacture of sulphuric acid), in order to obtain a new material for the iron and steel industry.

The invention has for object to obtain as residues from the roasting of iron pyrites a material containing magnetic ferric oxide, easily purified by magnetic separation, for the purpose more especially of supplying the iron and steel industry with raw material richer in iron content and purer than ordinary ores and "ashes of pyrites".

The method may be applied to the residues as they come out of the roasting furnaces, as also to ashes partially or wholly cooled as they are obtained to-day.

The invention is based on the following considerations:

The residues from the roasting of the iron pyrites usually called "ashes of pyrites" are mainly composed of ferric sesquioxide and contain, beside gangue, variable percentages of copper, zinc, lead, arsenic, phosphorus, as also sulphur, which has escaped at the time of the roasting of the pyrites in the furnaces. These residues are used by the iron and steel industry in the blast-furnaces, but it is well known that some of the metals, and especially of the metalloids, mentioned above constitute "impurities", the presence of which is detrimental to the quality of the iron.

The result is that metallurgists seldom use "ashes" and, the cost of transport and handling being equal, they give the preference to ores, although the iron content is nearly always lower than that of "ashes of pyrites".

The method according to the invention is characterized in that it consists in pouring into water the incandescent residues from the roasting of iron pyrites without allowing them to come into contact with the surrounding air, so as to obtain a material containing ferric oxide, which may be easily separated from other metalloids, metals and gangue.

In order to carry out the method according to the invention, I may, for example, operate as follows:

A tank of suitable shape and size containing water is placed immediately below the roasting furnace conveniently arranged, so that when the incandescent residues of the roasted pyrites leave the roasting furnace they fall directly into the water in the tank without coming into contact with the surrounding air. In order to prevent an excessive rise in the temperature of the water, it is renewed either by partial draining and successive refilling, or by providing for continual feeding and draining of the water in the tank at corresponding rates.

If during the roasting of the pyrites the combustion of sulphur has not been complete, and their residues, on leaving the furnace, still contain a large quantity of it, there is inserted between the outlet of the roasting furnace and the tank containing the water, a tube with adjustable air intake, provided on the inside with a mixing conveyor of some kind, so that the residues, instead of falling directly into the water, flow slowly from one end of this tube to the other. This tube must be covered with nonconducting material or be heated on the outside so that in the course of their travel through the tube the residues may retain the temperature at which they have left the roasting furnace, in other words, so that they may remain incandescent, so as to allow the complete combustion of the sulphur before the residues fall into the water.

By means of the foregoing operations it is possible to avoid all formation of ferric sesquioxide in the residues from the roasting of pyrites and the iron they contain remains in the state of magnetic oxide.

The residues are next withdrawn from the water either with a shovel or by any mechanical or other means, and undergo summary crushing by means of a suitable crusher. They are then passed through a magnetic separator in order to separate the magnetic ferric oxide from the other metals, metalloids and gangue.

If at the time they are put into the roasting furnace the fragments of pyrites are already small in volume, the crushing prior to the magnetic separating operation may be dispensed with.

When these operations are completed, the principal mass obtained from the separation (the useful mass) is almost exclusively composed of magnetic ferric oxide and when analyzed reveals a considerably higher iron content than is to be found in iron ores and ordinary "ashes of pyrites"; it is free, or almost free from all "impurities" these having been eliminated, especially by the magnetic separation (secondary mass).

If the pyrites roasted in the furnaces have a copper content sufficiently high for it to be worth while to recover that metal, all that will be necessary will be to feed into the usual lixiviating apparatus the secondary mass obtained by the magnetic separation and composed only of "impurities" (gangue, metalloids and no magnetic metals).

The method is also applicable to "ashes of pyrites" obtained in the ordinary way, i. e., to roasting residues already oxidized into sesquioxide of iron which is well known as being non-magnetic.

The following method is then employed:

The ashes of pyrites are heated while free of all contact with the surrounding air until they become incandescent. For this operation a tube similar to that described above for the treatment of the residues when they leave the furnace, i. e. a tube provided on the inside with a mixing conveyor, may be used. This tube which is to be heated on the outside (not simply covered with non-conducting material) will constitute a continuous furnace. The speed of the conveying device as also the heating must be regulated so that ashes may be incandescent when they reach the outlet end; they will then fall directly into the tank containing the collecting water, without coming into contact with the surrounding air. Then the above described process is employed for the crushing and the magnetic separation.

According to a modification and in case there are several furnaces for roasting pyrites, in order to obviate the necessity of providing each of the said furnaces with the collecting apparatus described above and in order also to avoid having to carry out additional operations so that in the last stages of the furnace operations the residues may be maintained at the required temperature enabling them to emerge in a state of incandescence, the following method may be employed:

A heating furnace, provided with a suitable mixing and conveying device and heated internally by the direct combustion of a reducer gas, is installed in the vicinity of the roasting furnace room (the dimensions of this furnace are to be calculated in proportion to the total quantity of residues which the whole of the roasting furnaces can produce).

As they leave the roasting furnaces the residues are to be collected in trucks as is usually done and conveyed to the heating furnace, in which, due to the combustion of the reducing gas, they are heated to incandescence irrespective of whatever cooling may have occurred in them.

The residues, which once more have become incandescent, will then, on leaving the heating furnace, be collected in a tank containing water without being allowed to come into contact with the surrounding air and will then be fed into the magnetic separator, as above stated.

The purified magnetite may then be agglomerated directly in a revolving furnace heated by a mixture of producer gas and masut entering this revolving furnace through the end used for the outlet of the residues. At the same time in order to complete the combustion of the gas and at the same time cause temporary superoxidizing into a sesquioxide, of a portion of the magnetite (which will facilitate subsequent reducing to metallic iron which is to constitute the agglomerating material and increase the iron content of the product), air is allowed to penetrate through the opposite end of the revolving furnace, i. e., the inlet end for the residues.

The agglomerated magnetite is a product that the metallurgical industry can use in blast-furnaces as a new type of raw material, offering the following direct and indirect advantages over those at present treated:

(a) Higher yield of iron;
(b) Production of iron metal of better quality;
(c) Considerable decrease in slag and easier elimination of same;
(d) Increase in blast-furnace efficiency;
(e) Smaller percentage of fuel to be used in blast-furnaces as compared with that required for the treatment of ordinary iron ores.

Of course, if instead of agglomerates it is desired to obtain cast iron or even steel, it will suffice to use, with the above mentioned revolving-furnace, a suitable melting furnace in which the magnetite agglomerated in the revolving furnace falls directly at a high temperature. The purified magnetite should be fed in together with the necessary materials for forming a suitable slag, and also with the coal or masut in sufficient quantity to carry out the complete reduction of the said magnetite.

The regulation of the temperature of this melting furnace and the addition in suitable proportions of the products usually employed for this purpose in metallurgical practice, will make it possible to produce, as desired, either pig-iron or special steel.

The combustion gases, either in the agglomerating furnace or in the melting furnace, are used for the previous drying of the magnetite.

It is obvious that the invention is in nowise limited to the embodiments which have been more especially described by way of example, but that it extends to all possible modifications coming, fairly, within the scope of the appended claim.

I claim:

The method of producing a material suitable for use as a base material in the smelting of ferrous metals, which consists in discharging into water the incandescent residues from the roasting of iron pyrites, while preventing the cooling of said residues, and supplying air thereto in a quantity limited to that required for the complete combustion of such sulphur as may be contained therein, before reaching the water, and subsequently separating the iron containing from the iron free portion of said residues.

INEO DE VECCHIS.